Figure 1:
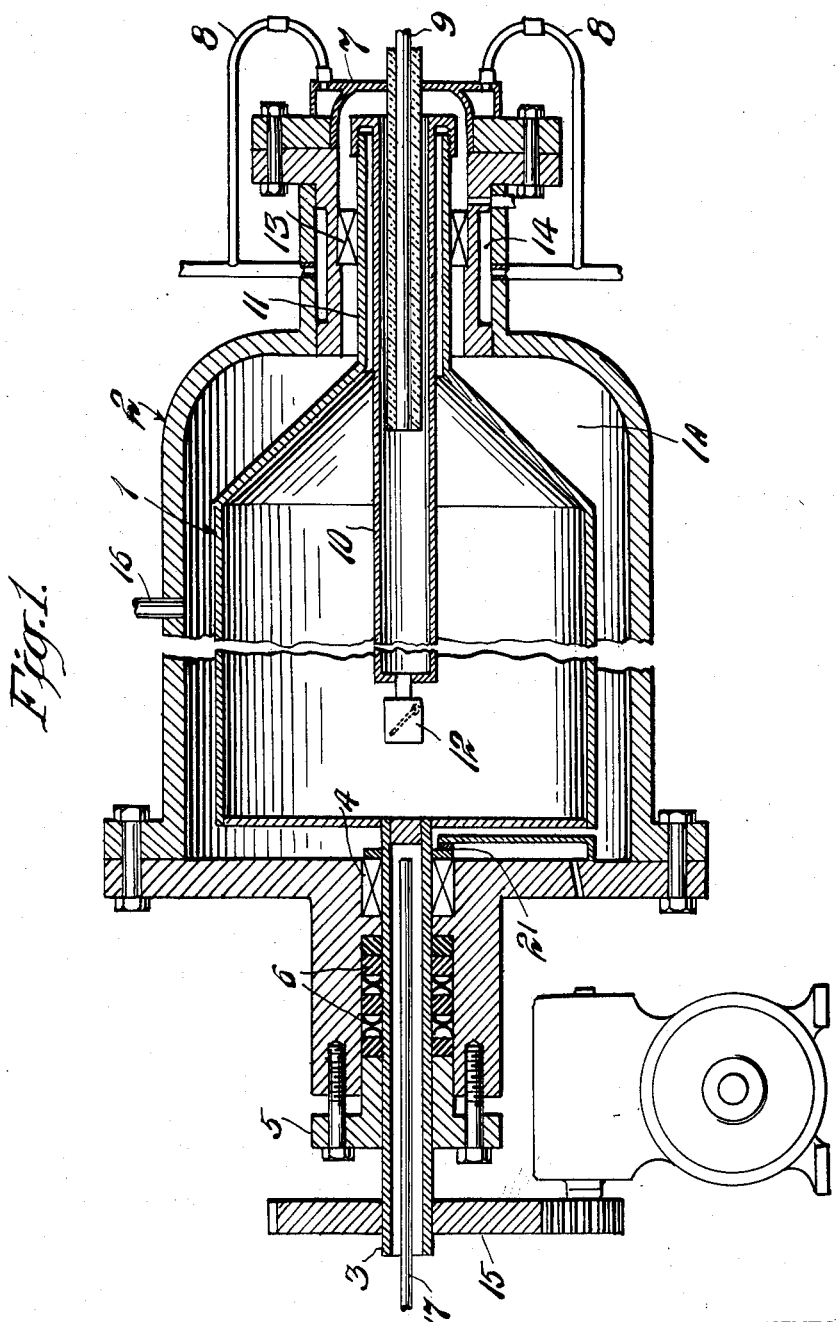

Feb. 5, 1963   J. E. CARTER ET AL   3,076,693
METHOD FOR PRODUCING NICKEL CARBONYL
Original Filed April 10, 1958   2 Sheets-Sheet 1

INVENTORS
JOSEPH EDWIN CARTER
CHARLES BRUCE GOODRICH
BY
ATTORNEY

Feb. 5, 1963  J. E. CARTER ET AL  3,076,693
METHOD FOR PRODUCING NICKEL CARBONYL
Original Filed April 10, 1958  2 Sheets-Sheet 2
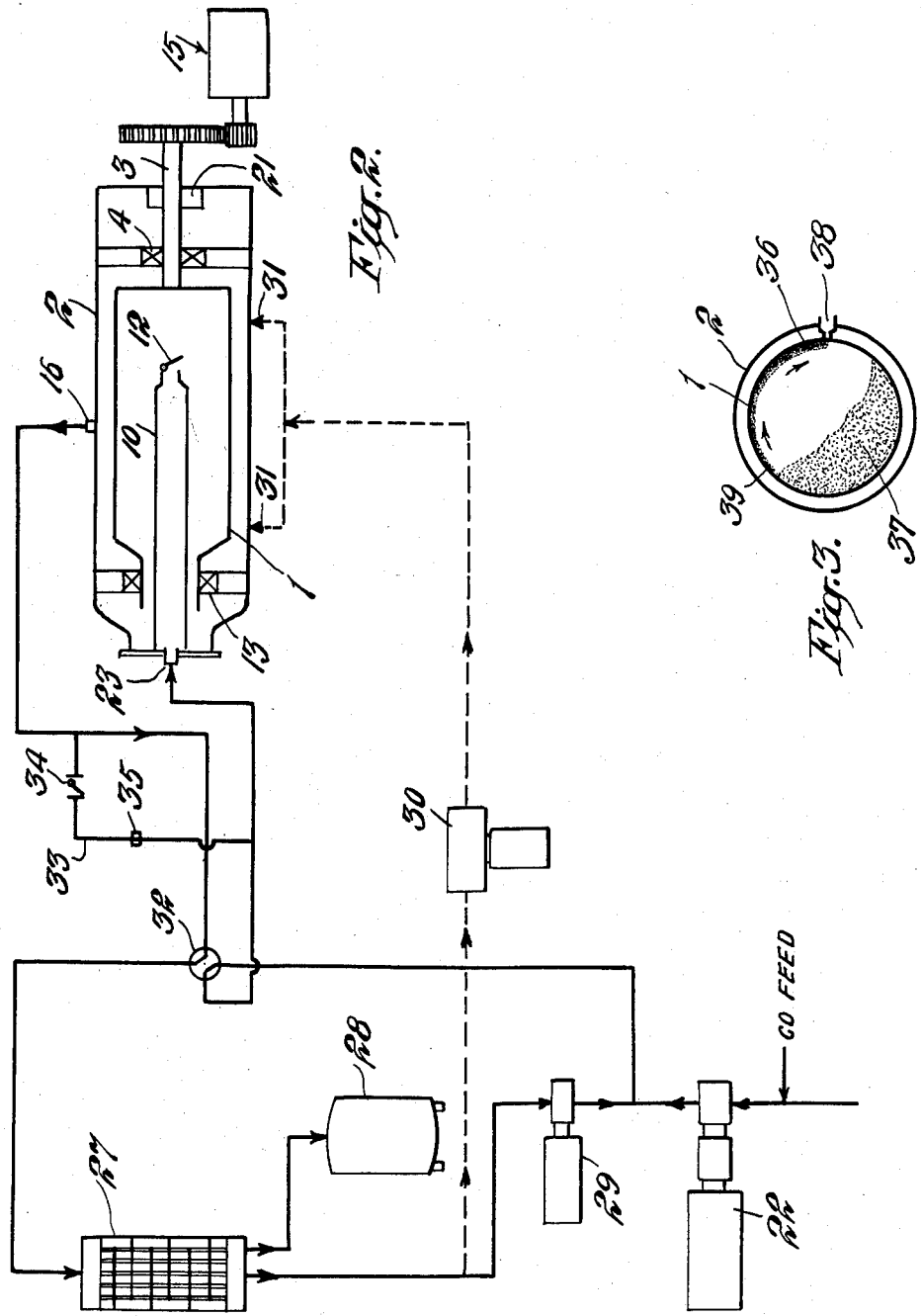
INVENTORS
JOSEPH EDWIN CARTER
CHARLES BRUCE GOODRICH
BY
ATTORNEY cordance with the invention for carrying out reactions
United States Patent Office 3,076,693
Patented Feb. 5, 1963

3,076,693
METHOD FOR PRODUCING NICKEL CARBONYL
Joseph Edwin Carter and Charles Bruce Goodrich, Huntington, W. Va., assignors to The International Nickel Company, Inc., New York, N.Y., a corporation of Delaware
Original application Apr. 10, 1958, Ser. No. 727,592, now Patent No. 2,987,381, dated June 6, 1961. Divided and this application Apr. 24, 1959, Ser. No. 808,766
4 Claims. (Cl. 23—203)

The present invention relates to an improved apparatus and method for conducting reactions between solids and fluids and, more particularly, to an improved apparatus and method for conducting reactions between gases and finely-divided solids.

The first problem in all reactions between fluids, e.g., gases, and finely-divided solids is to secure contact between the fluid and the solid. In the case of lump or granular materials it is easy to obtain circulation of gases through porous beds of the solid and secure good contact between the gas and the surface of each large particle. However, the ratio between surface area and weight of large solid particles is low and the penetration of the gas to the center of the particle is usually very slow. The use of finely-divided solids provides a much greater surface area per unit of weight and a lesser distance from the surface to the center of the particle, thus greatly speeding the rate of reaction. The use of finely-divided solids poses other problems, however, for it now becomes impossible to obtain good gas circulation through a static bed and any distburbance of the bed immediately creates a dust problem.

Another requirement of most gas-solid reactions is control of temperature throughout the reacting bed. This can be most difficult in static beds, or very precise under conditions of rapid solid movement. Again, however, turbulence combined with gas flow through finely-divided solid beds creates problems of dust recovery which often negate other advantages of using finely-divided solids.

Various methods of reacting gases with finely-divided solids have been devised with the view of increasing reaction rates and yields by securing better gas-solid contact and better temperature control. These include hand or mechanically rabbled reactors, multiple hearth furnaces, flash roasting furnaces, rotary kilns and fluid bed reactors. The rotary kiln has been successfully used for a wide variety of gas-solid reactions and the more recent fluid bed techniques achieve excellent results where finely-divided solids can be maintained in a fluid condition. All of these methods are subject to dusting problems however, and often the equipment required for dust collecting and returning the dust to the reactor is more complicated and expensive than the reactor itself. Furthermore, any dust collecting system which must return dust to the reactor is inefficient and mechanically troublesome. Reactant leaving the reaction chamber is no longer in the zone of optimum temperature. In some reactions, for example, gas synthesis, the wrong products are thus formed and actually became impurities.

Although many attempts were made to overcome the foregoing difficulties and other disadvantages, none, as far as we are aware, was entirely successful when carried into practice commercially on an industrial scale.

We have now discovered a method for reacting fluids with solids and, more particularly, of reacting gases with finely-divided solids wherein a good contact of gas to solid is achieved and wherein satisfactory temperature control of the reaction is likewise achieved but wherein the dusting problem which has plagued prior art methods is eliminated. The method contemplated by the present invention provides a solid in contact with a fluid at all times and thus maintains the solid in the zone of reaction and under optimum control.

It is an object of the present invention to provide an improved method for reacting fluids and solids wherein the dusting problem associated with reactions involving finely-divided solids is eliminated.

The invention also contemplates providing a method for reacting fluids and finely-divided solids wherein good fluid-solid contact and good temperature control is achieved.

It is a further object of the invention to provide a method for reacting solids wherein positive control of dusting from the solids is achieved.

Other objects and advantages will become apparent from the following description taken in conjunction with the accompanying drawing, in which:

FIGURE 1 depicts a rotary kiln constructed in accordance with the invention for carrying out reactions between a gas and a finely-divided solid;

FIG. 2 depicts schematcially an apparatus for carrying out the reactions between finely-divided nickel and carbon monoxide under conditions of elevated temperature and pressure to produce nickel carbonyl; and FIG. 3 shows the cross section of a kiln constructed in accordance with the invention which is provided with high pressure jets to remove from the sides of the kiln an adhering layer of solids.

Broadly stated, the present invention is directed to an apparatus which comprises the combination of a rotary kiln adapted to contain a finely-divided solid and having at least a portion of the surface thereof made of a filter material which is permeable to fluids but is impermeable to finely-divided solids, and a fluid-impermeable enclosure substantially surrounding said kiln and adapted to provide a free space between the outer surface of said rotary kiln and the inner surface of said enclosure, means for introducing a fluid to the interior of said rotary kiln, means for conducting a fluid from said enclosure, means for introducing finely-divided solid material to the interior of said rotary kiln, and means for rotating said rotary kiln. The apparatus contemplated in accordance with the invention is particularly adaptable for conducting reactions between a fluid, e.g., a gas, and a finely-divided solid to produce a fluid product.

In accordance with the invention, the finely-divided solid is confined in a reaction zone in the form of the chamber of a rotary kiln having at least a portion of the wall thereof constructed of a filter material. Such filter materials are well known in the art and may comprise a porous non-metallic material, such as a ceramic, or a porous metallic material, such as porous stainless steel, porous nickel-copper alloy, porous nickel-chromium-iron alloy, porous high temperature alloys including age-hardenable alloys, porous metal-ceramic alloys, aluminum, etc. Such metallic filter materials are advantageous in that they are characterized by substantial mechanical strength. Such filters may have a variety of pore sizes but in general the filters employed in accordance with the present invention will have a maximum mean pore size of about 135 microns. Filters having finer mean pore sizes as fine as about 5 microns and even finer may be employed depending upon the nature of the reaction involved, the particle size of the solid material treated, and the efficiency of filtration desired. The particle size of the solid material treated in accordance with the invention may be within the usual range of particle sizes which are employed in conducting fluid bed reactions, i.e., about 10 to 400 mesh (0.0787 inch to 0.0015 inch). The invention is not limited to solids having the foregoing particle size since a mechanical means of agitation embodying a rotary kiln is employed in accordance with the in vention. Accordingly, the particle size of the finely-divided solids treated in accordance with the invention may lie between sub-micron sizes and ½ inch particles, or even coarser.

Preferably, the apparatus contemplated in accordance with the invention comprises an inner chamber or container comprising a rotary kiln having porous walls and an outer chamber or container made of impermeable material defining a space between the outer wall of the inner chamber and the inner wall of the outer chamber. A complete circuit for the reactant fluid and the fluid products of reaction is provided in that the reactant fluid, e.g., gas, is introduced into the interior of the rotary kiln and is caused to travel through at least a portion of the finely divided solid contained therein, thence through the porous walls of the rotary kiln and through the space between the inner and outer chambers to exit ports in the outer chamber. Positive flow of the fluid reactant and of the fluid products of reaction is thus achieved. The inner and outer chambers are preferably constructed to permit carrying out reactions at elevated temperatures and pressures. If need be, auxiliary heating and/or cooling means may be provided to secure temperature control within the kiln and the outer walls of the outer chamber may be insulated where required. The movement of fluid reactant, e.g., gas, through the rotary kiln by itself causes further agitation, e.g., turbulence or movement, of the solid particles contained therein and this movement is enhanced by rotation of the inner chamber or rotary kiln. The dust created by the agitation is stopped by the porous walls of the inner chamber or rotary kiln and is retained therein so that the solids continue to react with the gas passing through said kiln and the walls thereof.

In order to give those skilled in the art a better understanding of the invention, the following illustrative examples are given:

*Example I*

The reduction of nickel oxide will be described in conjunction with the apparatus illustrated in FIG. 1 which depicts a rotary kiln contemplated in accordance with the invention. Essentially, the apparatus depicted in FIG. 1 comprises a thin-shelled rotary kiln 1, which preferably is cylindrical in form and has at least a portion of the surface thereof made of a porous material such as porous stainless steel sheet. Kiln 1 is enclosed in a substantially cylindrical stationary pressure vessel 2 to allow operation under pressure, to provide temperature control and to control flow of exit gas coming from the kiln. The kiln 1 is provided with a hollow driving shaft 3 which is journaled in bearings 4 and is provided with a packing gland assembly 5, sealing rings 6 and cooling water supply pipe 17. A removable cap 7 which is provided with water connections 8 and an inlet gas pipe 9 permits loading of the kiln. The kiln is also provided with an internal filter 10 which is screwed into the neck 11 of the kiln and which is conveniently made from the same filter material employed in rotary kiln 1. A check valve 12 is provided at the end of the internal filter 10. A bearing 13 provided with a water jacket 14 completes the assembly of the unit. The kiln is adapted to be turned to an upright position such that the cap 7 is on top. While in this position, the cap and internal filter are removed and a charge of nickel oxide having a particle size of ½ inch to 8 mesh (0.0937 inch) including as much as 5% fines below 8 mesh is introduced into the kiln. The internal filter and cap are replaced and the piping re-connected. The kiln is then rotated to a horizontal position. Hydrogen at a temperature of about 700° F. (the hydrogen temperature may be in the range of about 500° F. to 1000° F. or even higher) is introduced through the inlet pipe 9 from whence it passes through the internal filter 10 and the check valve 12 into the kiln. The kiln is rotated by the drive 15 applied to the shaft 3. The hot hydrogen heats and reduces the nickel oxide charge in the kiln and the gaseous products of reaction pass through the porous cylindrical portion of the kiln 1 into the substantially annular intermediate space 1A and are then led through the port 16 of the outer pressure vessel.

The flow of hydrogen is regulated to hold at least the finer portion of the charge on the porous surface of the kiln as this provides excellent gas-solid contact. In the case of the reduction of nickel oxide with hydrogen, it is convenient to decrease the gas flow when the reduction nears completion in order to keep the porous kiln surface relatively clean and to keep a larger portion of the charge tumbling in the bottom of the kiln. In this manner, sintering of the fine reduced material to the side of the kiln is prevented.

It will be appreciated that the finer portion of the charge is held in contact with the surface of the porous kiln 1. When the build-up of fine material on the porous surface of the kiln becomes too thick, an excessive pressure drop in the hydrogen line may result. In order to correct this condition, the gas flow may be reversed momentarily and this will drop the charge from the kiln surface and free the pores thereof. When the gas flow is reversed, the check valve 12 closes and the gas flow must then pass through the internal filter 10, thus keeping the charge in the kiln.

*Example II*

The production of nickel carbonyl by reacting carbon monoxide with finely-divided nickel will now be discussed in conjunction with FIG. 2 which is a simplified flow sheet for carrying out the aforementioned reaction in accordance with the invention. Finely-divided nickel having a particle size of below about 100 microns is charged into the cylindrical rotary kiln 1 which is constructed of porous stainless steel having a mean pore size of about 20 microns. The rotary kiln 1 is rotated by an external drive mechanism through a shaft 3 which is journaled in bearings 4. The rotary kiln 1 is enclosed in a stationary shell 2 which is provided with a seal 21 to prevent leakage of gases at the operating pressure. A compressor 22 compresses carbon monoxide to the operating pressure of about 28 atmospheres (although the pressure may be much higher or lower, e.g., about one atmosphere to about 75 atmospheres) and the compressed carbon monoxide is introduced into the kiln 1 through inlet 23. Most of this gas enters through the check valve 12 though it is also free to flow throug the porous internal metal filter 10 positioned within the rotary kiln 1. In operation, the charge of nickel powder is exposed to the stream of carbon monoxide due to the tumbling action through the rotation of kiln 1 by means of the shaft 3 which is powered by the drive 15. The finer particles of the metal powder adhere to the porous metal walls of the kiln 1 and distribute themselves over the surface in a uniform layer due to the pressure of the gas flowing through the porous walls of the kiln. This action provides excellent gas-solid contact at the kiln wall. The layer of solids held against the kiln wall can be removed and replaced with a fresh layer of solids from the charge by a periodic brief reversal of carbon monoxide gas flow. The carbon monoxide not consumed by the reaction and the nickel carbonyl formed by the reaction pass through the porous walls of the kiln 1 and leave the outer vessel 2 at the exit port 16. These gases, which are heated in the range of about 100° to about 500° F. by the reaction, are led through the condenser 27 where they are cooled to condense nickel carbonyl as a liquid which is collected in the tank 28. The unused carbon monoxide passes through the pump 29 back to the kiln 1 along with make-up carbon monoxide from the compressor 22. Since the production of nickel carbonyl is an exothermic reaction, an optional blower 30 is provided in the event it is necessary to circulate additional cool carbon monoxide through the outer vessel 2 in order to cool the walls of the kiln 1. This gas is admitted through the ports 31 in the outer shell 2 and may be employed to control the temperature of the reaction. When the thickness of the layer of solids on the porous walls of the kiln 1 is built up to an undesirable extent, the reactant gas flow is reversed in order to backblow gas through the porous metal wall so as to provide a control of the thickness of the solids layer. This is accomplished by operating the four-way valve 32 which reverses the direction of gas flow through the kiln. The by-pass line 33 contains check valve 34 and an orifice 35 which allows about one-half the volume of gas to by-pass the kiln. The balance of the gas passes through the porous walls of the kiln 1, removing solids adhering to the inner surface. Check valve 12 closes, thus forcing the gas to leave the kiln through the porous inner metal filter 10, thereby insuring that no dust escapes from the kiln.

In carrying out the reaction as depicted in accordance with the flow sheet in FIG. 2, frequent removal and replacement of the layer of fines adhering to the porous walls of the kiln 1 is an important factor in obtaining a rapid extraction of nickel in the form of nickel carbonyl. A technique for accomplishing this purpose is continuous backblowing by a source of reactant fluid, e.g., gas, which is achieved by directing a line of high pressure gas jets against the porous outer surface of the kiln 1. This method is illustrated in FIG. 3 showing the continuous removal of the adhering layer of fines 36 just before said layer is immersed in the tumbling bed of solids 37 at the bottom of the kiln. As shown in this cross sectional view, the layer of adhering solids is removed by the high pressure gas jets 38 positioned at a point shortly before the rotating side of the kiln 1 is submerged below the bed of solids 37 and a new layer is formed at the point 39 on the rotating side of the kiln 1 as the side mereges above the bed of solids 37. In this manner, a continuous sweeping of the porous metal face of the kiln is provided. It will be noted that the aforementioned line of high-pressure gas jets is placed substantially parallel to the major axis of the cylindrical rotary kiln.

*Example III*

In still another example demonstrating the versatility of the apparatus contemplated in accordance with the present invention, the charge of nickel oxide sinter reduced by the procedure described in Example I is treated further to produce nickel carbonyl without removing it from the kiln. This is accomplished by cooling the charge of reduced sinter in the kiln to about 100° F. and passing carbon monoxide at a temperature of about 80° F. and a pressure of about 30 atmospheres through the kiln until the nickel metal content of the charge is substantially extracted and recovered as nickel carbonyl in the manner described hereinbefore in connection with FIG. 2. In this manner, the nickel content of the original nickel oxide charge is substantially completely recovered as nickel carbonyl without removal of the original nickel oxide charge or of the reduced nickel from the apparatus.

The present invention also contemplates a method for conducting reactions between finely-divided solids and fluids to produce a fluid product wherein the finely-divided solid is confined in a reaction zone bounded by a filter or porous membrane and is agitated in contact with the fluid while in said reaction zone and wherein the fluid product of reaction is withdrawn from the reaction zone through said filter or porous membrane which is permeable to the fluid reaction product and the fluid, e.g., gas, but is impermeable to the finely-divided solid.

Those skilled in the art will appreciate from the foregoing description that the method contemplated in accordance with the present invention is particularly applicable to reactions between a solid and a fluid to produce a fluid product and including, for example, the reaction between carbon monoxide and nickel to produce nickel carbonyl and the reduction of nickel oxide with a gas such as hydrogen to produce water vapor. The roasting of metal sulfides, such as nickel sulfide, with an oxidizing gas, such as air, may also be mentioned. In conducting such reactions, the filter material employed in the rotary kiln wall and in the internal filter mentioned hereinbefore (if one be used) are selected so as to be permeable to the reactant gas and the fluid product of reaction but impermeable to the finely-divided solid. The apparatus contemplated in accordance with the invention is also applicable to processes wherein the fluid, e.g., gas, which is conducted through the rotary kiln does not enter into the reaction involved, as in the case of the drying of various solids by passing relatively dry gas thereover at an elevated temperature to remove the water content of the solid as vapor, and to reactions involving decomposition of solid materials by heat, as in the calcination of carbonates.

It will be apparent from the foregoing description that the outer chamber shown as reference numeral 2 in the drawing may be made of the usual structural metals, such as carbon steel, alloy steel, stainless steel, high-nickel alloys, etc., having regard for the particular operating conditions of temperature and pressure involved.

It will be appreciated that the process of the present invention may be applied to the reduction of the oxides of such metals as copper, nickel, iron, cobalt, manganese, etc., and to the formation of carbonyls of such metals as iron, nickel, cobalt, molybdenum, chromium, and the precious metals. It will also be appreciated that conventional atmospheres employed for reducing metal oxides may be introduced into the apparatus and used in the process embodying the present invention. Thus, atmospheres such as water gas, producer gas, partly combusted natural gas, natural gas, cracked ammonia, etc., may be employed in conjunction with the present invention. The invention is applicable to reactions which take place over a wide range of temperature and pressure. Thus, when the invention is applied to the reduction of metal oxides, conditions in the rotary kiln may be controlled to provide temperatures in the range of about 300° F. to 2000° F. and pressures in the range of about atmospheric to about 75 atmospheres. Again, in conjunction with the formation of metal carbonyls, pressures ranging from atmospheric to about 400 atmospheres and temperatures ranging from about 100° F. to about 700° F. may be employed.

It will also be appreciated that the invention can be applied to the formation of metal carbonyl from a variety of materials containing metal values as low as about 1%, although preferably the metal value should be at least about 10% of the material treated. Thus, ores, concentrates and various materials such as grinding dust can be treated directly in the apparatus contemplated in accordance with the present invention to extract the metal value thereof as metal carbonyl even though the metal value be bound chemically in the material in the form of oxides, etc.

It will be noted that a number of advantages are provided in accordance with the invention in carrying out reactions between finely-divided solids and fluids, e.g., gases, in employing the special rotary kiln contemplated in accordance with the invention. Thus, intimate fluid-solid contact is achieved. It is possible to employ a high ratio of surface area to weight of the solid reactant. Good temperature control is achieved throughout the bed of solids. It is possible to operate at substantial pressure which results in an increase in the rate of many reactions. There is no dust loss from the kiln vessel itself. Furthermore, positive control of reactant gas and fluid product is achieved and this is very important in the case where such materials are extremely poisonous, for example, in the case where a reactant gas is carbon moonxide and a fluid product of reaction is nickel carbonyl.

The present application is a division of our co-pending application Serial No. 727,592, filed April 10, 1958 (now U.S. Patent No. 2,987,381, granted June 6, 1961).

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. The method for producing nickel carbonyl from carbon monoxide and finely-divided nickel which comprises introducing a quantity of finely-divided nickel into a reaction zone, introducing carbon monoxide into said reaction zone while maintaining said reaction zone at a temperature of about 100° F. to about 500° F. and a pressure of about one atmosphere to about 75 atmospheres, mechanically agitating said finely-divided nickel in the presence of said carbon monoxide to produce nickel carbonyl while filtering nickel carbonyl from said reaction zone, and while confining unreacted nickel within said reaction zone.

2. The method for producing metal carbonyl from carbon monoxide and finely-divided metal which comprises introducing a quantity of finely-divided metal into a reaction zone, introducing carbon monoxide into said reaction zone while maintaining said reaction zone at a temperature of about 100° F. to about 700° F. and a pressure of about one atmosphere to about 400 atmospheres, mechanically agitating said finely-divided metal in the presence of said carbon monoxide to produce metal carbonyl while filtering metal carbonyl from said reaction zone, and while confining unreacted metal within said reaction zone.

3. The method for producing nickel carbonyl from carbon monoxide and finely-divided nickel which comprises introducing a quantity of finely-divided nickel having a particle size from sub-micron sizes to about one-half inch particles into a reaction zone, introducing carbon monoxide into said reaction zone while maintaining said reaction zone at a temperature of about 100° F. to about 500° F. and a pressure of about one atmosphere to about 75 atmospheres, tumbling said finely-divided nickel against a filter in the presence of said carbon monoxide to produce nickel carbonyl while filtering nickel carbonyl from said reaction zone, and while confining unreacted nickel within said reaction zone.

4. The method for producing metal carbonyl from carbon monoxide and finely-divided metal which comprises introducing a quantity of finely-divided metal having a particle size from sub-micron sizes to about one-half inch particles into a reaction zone, introducing carbon monoxide into said reaction zone while maintaining said reaction zone at a temperature of about 100° F. to about 700° F. and a pressure of about one atmosphere to about 400 atmospheres, tumbling said finely-divided metal against a filter in the presence of said carbon monoxide to produce metal carbonyl while filtering metal carbonyl from said reaction zone, and while confining unreacted metal within said reaction zone.

References Cited in the file of this patent

UNITED STATES PATENTS

| | | |
|---|---|---|
| 760,852 | Dewar | May 24, 1904 |
| 1,251,202 | Ellis | Dec. 25, 1917 |
| 1,924,453 | Muth | Aug. 29, 1933 |
| 2,159,412 | Wallis | May 23, 1939 |
| 2,242,115 | Danciger | May 13, 1941 |
| 2,761,769 | Elder | Sept. 4, 1956 |
| 2,936,217 | Anderson | May 10, 1960 |

FOREIGN PATENTS

| | | |
|---|---|---|
| 13,207 | Great Britain | A.D. 1908 |
| 671,634 | Great Britain | May 7, 1952 |

OTHER REFERENCES

Perry's, "Chemical Engineer's Handbook," 3rd edition, pages 1029–1034, McGraw-Hill Publ. Co., New York.